(12) United States Patent
Nhu

(10) Patent No.: US 7,457,420 B2
(45) Date of Patent: Nov. 25, 2008

(54) METHOD AND SYSTEM FOR DETECTING SIGNAL MODES IN A BROADCAST AUDIO TRANSMISSION

(75) Inventor: Hoang Nhu, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 962 days.

(21) Appl. No.: 10/641,004

(22) Filed: Aug. 15, 2003

(65) Prior Publication Data

US 2005/0047603 A1 Mar. 3, 2005

(51) Int. Cl.
- H04H 20/47 (2008.01)
- H04H 20/88 (2008.01)
- H04H 40/36 (2008.01)
- H04H 20/48 (2008.01)
- H04H 40/54 (2008.01)
- H04J 15/00 (2006.01)
- H04R 5/00 (2006.01)
- H04N 7/00 (2006.01)
- H04N 5/60 (2006.01)

(52) U.S. Cl. ............... 381/11; 381/2; 381/10; 381/12; 381/22; 348/481; 348/483; 348/485; 348/738

(58) Field of Classification Search ........... 381/10, 381/11, 12, 1, 22, 2–4, 13–16; 348/462, 348/423.1, 515, 481, 483, 485, 738
See application file for complete search history.

(56) References Cited

U.S. PATENT DOCUMENTS 4,368,354 A * 1/1983 Furihata et al. ............. 348/485
4,399,329 A * 8/1983 Wharton .................... 370/480

* cited by examiner

Primary Examiner—Vivian Chin
Assistant Examiner—Douglas Suthers
(74) Attorney, Agent, or Firm—Sterne, Kessler, Goldstein & Fox PLLC

(57) ABSTRACT

A Japanese BTSC audio broadcast signal has three modes of transmission: mono, stereo, or dual mono. The control channel centering at 3.5 fH is one of the three channels in the J-BTSC signal, and contains information to indicate to the decoder which one of the three modes the audio transmission is in. The present invention uses a bandpass filter directly in the AM band, followed by envelope filtering and a decision circuit. Therefore, the need for AM demodulation and AM carrier detection is eliminated.

14 Claims, 6 Drawing Sheets

306

L = lower threshold
U = upper threshold if [w1(n) > U*w2(n)]
　Decision(n) = stereo
Else if [w2(n) > U*w1(n)]
　Decision(n) = DualMono
Else {if [w1(n) > L*w2(n)]
　　Or if [w2(n) > L*w1(n)]}
　Decision(n) = Decision(n-1)
Else Decision(n) = Mono Decision(n) → 402 w1(n) (from stereo tracker) — 320 w2(n) (from dual mono tracker) — 324

FIG. 4

METHOD AND SYSTEM FOR DETECTING SIGNAL MODES IN A BROADCAST AUDIO TRANSMISSION

BACKGROUND OF THE INVENTION

1. Field of the Invention

The present invention relates to signal processing in a Japanese audio broadcast signal.

2. Related Art

The Japanese Broadcast Television Systems Committee ("JBTSC") standard audio broadcast signal has three modes of transmission. These modes are mono, stereo, and dual mono. To serve both stereo and non-stereo television sets, the JBTSC standard requires the left ("L") and right ("R") channels of a stereo signal to be summed and transmitted as one signal in the space normally occupied by the mono audio signal. The summed L+R output, called the main channel signal, provides the mono signal of the original audio program content. This summed signal may be received by non-stereo television sets.

In stereo mode, the JBTSC system sends an L−R signal (herein referred to as "sub"), which is the difference between left and right channels. While this signal alone cannot be used by the television set, it is essential to reconstructing the stereo signals (L and R). In dual mono mode, the second mono audio program is transmitted in the sub channel.

A third channel, called the control channel, is inserted into the transmission to indicate whether the broadcast is in mono, stereo, or dual mono mode. This channel is AM modulated and requires a detector to figure out the actual broadcast mode.

SUMMARY OF THE INVENTION

A Japanese BTSC audio broadcast signal has three modes of transmission: mono, stereo, or dual mono. In order to distinguish between the three modes, the present invention bandpass filters directly in the AM band. This eliminates the need for AM demodulation and AM carrier detection.

In an embodiment, a control signal is input to two different bandpass filters. In an embodiment, the first bandpass filter is centered at 982.5 Hz from the AM carrier, which indicates stereo transmission. In an embodiment, the second bandpass filter is centered at 922.5 Hz from the AM carrier, which indicates dual mono transmission. Each of these bandpass filters is followed by its own envelope tracker. A decision circuit receives the outputs of both of the envelope trackers.

In order to determine the mode of the transmission, the decision circuit first compares the amplitudes of the outputs of the two envelope trackers. Because of the frequencies of the bandpass filters, the outputs are referred to as a stereo-filtered signal and a dual-mono filtered signal, respectively. If the amplitude of the stereo-filtered output is greater than an upper threshold, for example, three times the amplitude of the dual mono-filtered output, the transmission is determined to be in stereo mode. If the amplitude of the dual mono-filtered output is greater than, for example, three times the amplitude of the stereo-filtered output, the transmission is determined to be in dual mono mode.

If neither signal is at least, for example, three times larger than the other, the decision circuit again compares the amplitudes using a lower programmable threshold. In this comparison, if either signal amplitude is greater than the lower threshold, for example, 1.5 times the amplitude of the other signal, the transmission is determined to be in a state of transition. In this case, the new mode is determined to be the same as a previously determined mode. The programmable upper and lower thresholds form a hysterisys that prevents premature mode switching during mode transitions.

If neither of the amplitudes are greater than, for example, 1.5 times the amplitude of the other, the transmissions are determined to be in mono mode.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 4 is a block diagram of a decision circuit according to an embodiment of the present invention.

The present invention will be described with reference to the accompanying drawings. The drawing in which an element first appears is typically indicated by the leftmost digit(s) in the corresponding reference number.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Signal Mode Determination

Figure 1:
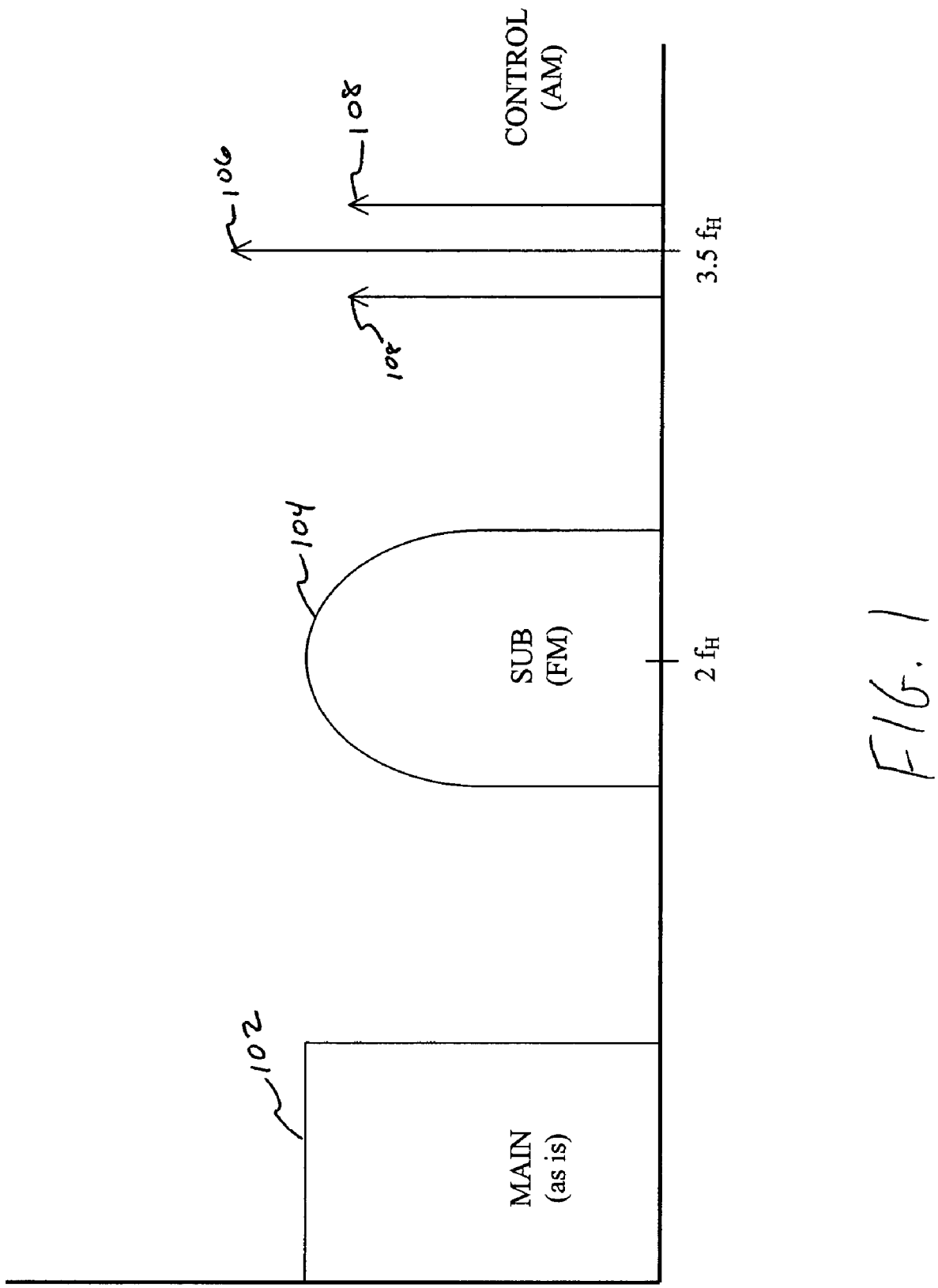
FIG. 1 is an illustration of the relationship between three channels (main, sub, and control) used in the JBTSC standard's composite spectrum.

As shown in FIG. 1, a JBTSC audio transmission includes a main channel 102, a sub channel 104, and a control channel 106. Main channel 102 is also referred to as the sum channel, since it carries the L+R audio signal. Sub channel 104 is FM modulated and can carry L−R (stereo mode) or the second mono program (dual mono). If control channel 106 contains an AM carrier, then the broadcast is in stereo or dual mono mode. Otherwise, the transmission is in mono mode.

Control channel 106 is typically centered at 3.5 $f_H$, $f_H$ being the horizontal scanning frequency. If there is a 60% AM carrier in control channel 106, then the transmission is in either stereo or dual mono mode. Otherwise, without this carrier, the transmission is in mono mode. When control channel 106 includes an AM carrier, sidebands 108 can be at either 982.5 Hz, which indicates stereo mode, or 922.5 Hz, which indicates dual mono mode.

Figure 2:
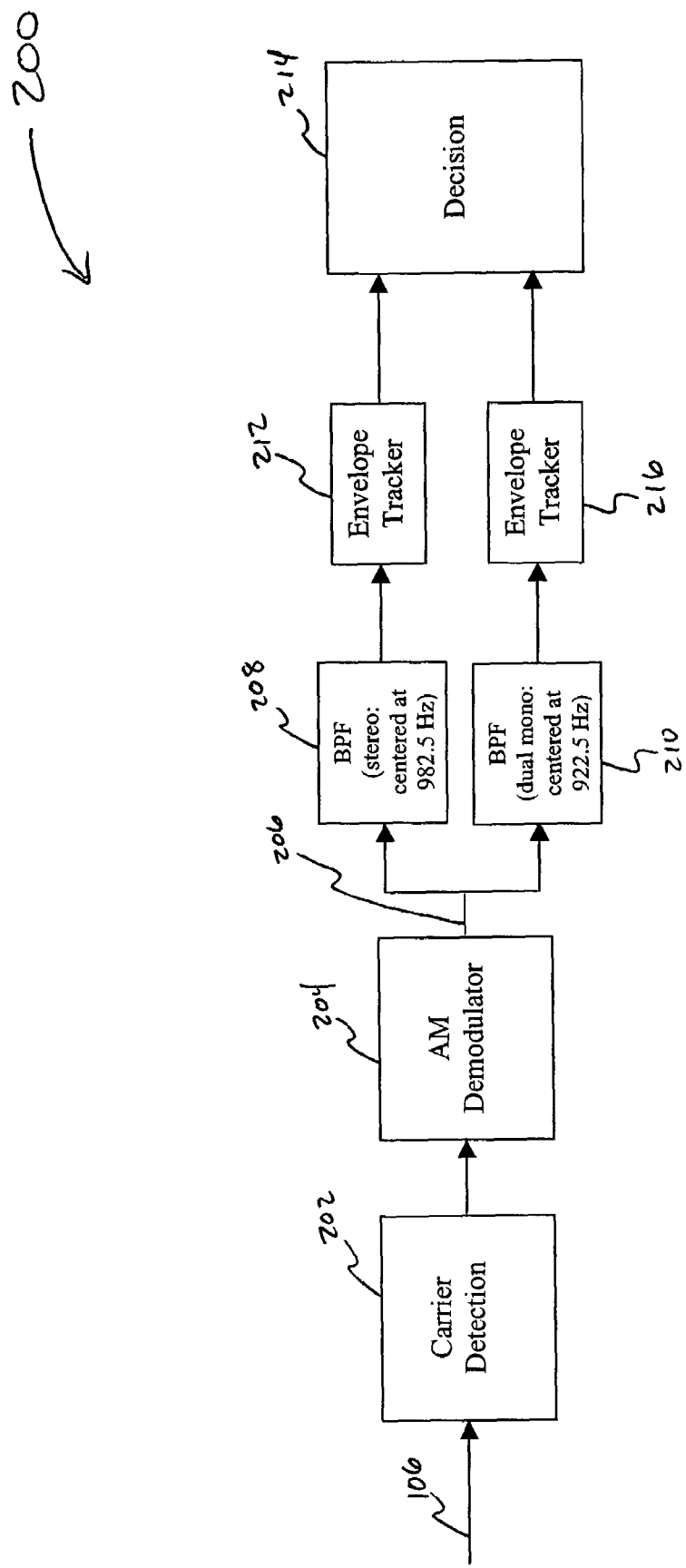
FIG. 2 is a block diagram of a conventional JBTSC processing system.

In an embodiment, the mode of JBTSC transmissions can be detected with an AM demodulator. FIG. 2 is a block diagram of a system 200 according to this embodiment. Carrier detector 202 detects the presence of an AM carrier in control channel 106. If this carrier exists, the AM demodulator 204 demodulates control channel 106 to baseband with a signal at either 982.5 Hz (stereo) or 922.5 Hz (dual mono). This baseband signal 206 is input to two bandpass filters. First bandpass filter 208 is centered at a first frequency. In an embodiment, the first frequency is 982.5 Hz. First envelope tracker 212 receives the output of first bandpass filter 208, and encases the signal in a smooth signal envelope. Decision circuit 214 receives the output of first envelope tracker 212.

Second bandpass filter 210 is centered at a second frequency. In an embodiment, the second frequency is 922.5 Hz. Second envelope tracker 216 receives the output of the second bandpass filter 210, and encases the signal in a smooth signal envelope. Decision circuit 214 receives the output of second envelope tracker 216. Decision circuit 214 then determines the mode of the JBTSC transmission.

Figure 3:
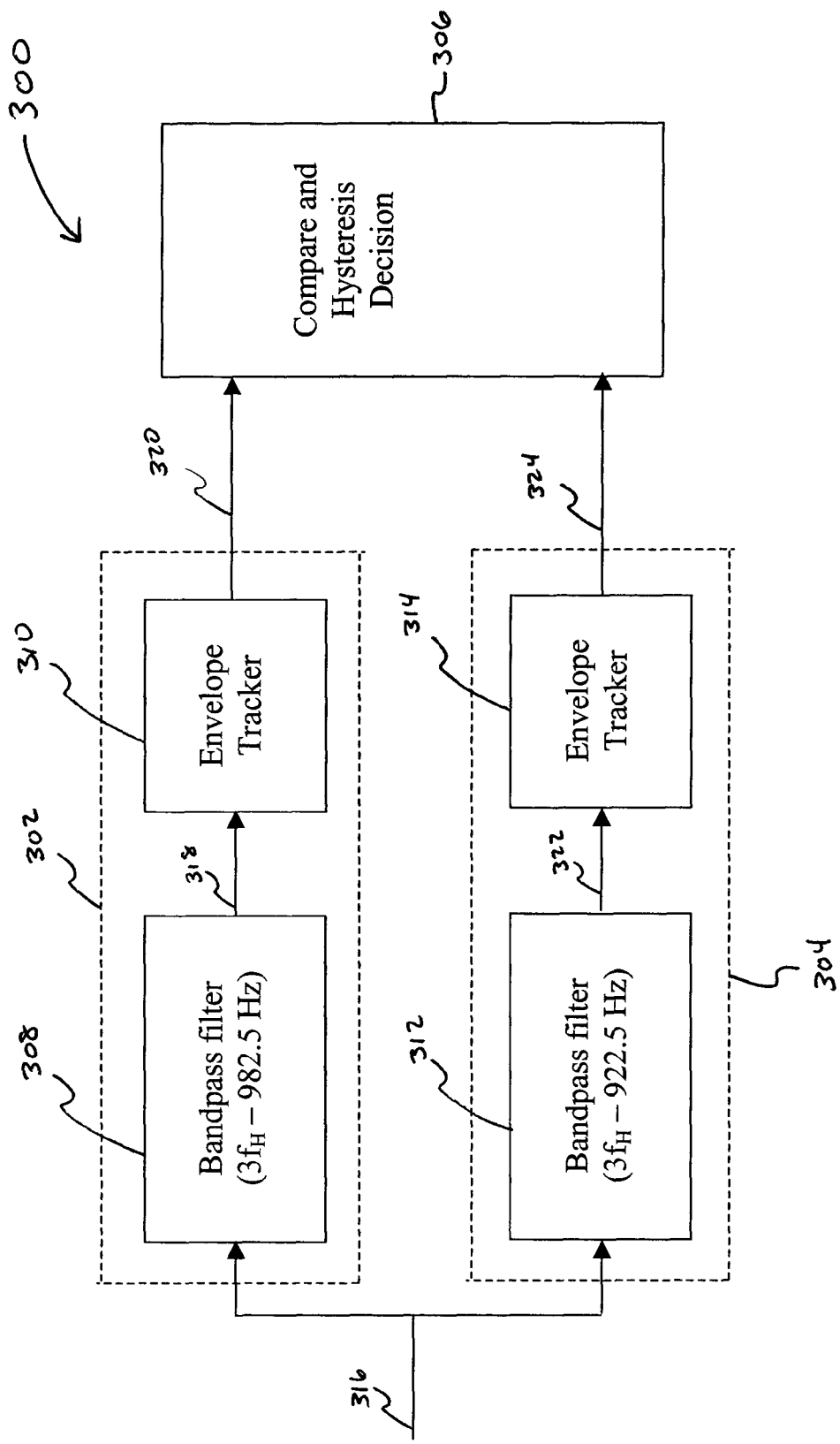
FIG. 3 is a block diagram of a JBTSC processing system according to the present invention.

FIG. 3 is a block diagram of a system 300 according to an embodiment of the present invention wherein bandpass filtering is performed directly in the AM band. In this embodiment, the need for AM demodulation and AM carrier detection is eliminated. System 300 includes a first signal path 302, a second signal path 304, and a decision circuit 306. First signal path 302 includes a first bandpass filter 308 and a first envelope tracker 310. In an embodiment, first bandpass filter 308 is centered at (3 $f_H$-982.5 Hz). First bandpass filter 308 allows an AM sideband at this frequency to pass through, but prevents an AM sideband at (3 $f_H$-922.5 Hz) from passing through.

Second signal path 304 includes a second bandpass filter 312 and a second envelope tracker 314. In an embodiment, second bandpass filter 312 is centered at (3 $f_H$-922.5 Hz). Second bandpass filter 312 allows an AM sideband at this frequency to pass through, but prevents an AM sideband at (3 $f_H$-982.5 Hz) from passing through.

An input signal 316, such as control signal 106, goes to both first path 302 and second path 304. First bandpass filter 308 filters input signal 316 to create filtered signal 318. First envelope tracker 310 encases filtered signal 318 in a smooth signal envelope to create signal 320. Second bandpass filter 312 filters input signal 316 to create filtered signal 322. Second envelope tracker 314 encases filtered signal 322 in a smooth signal envelope to create signal 324. Signal 320 and signal 324 are each input into decision circuit 306.

With bandpass frequencies as listed above, if the transmission is in stereo mode, the amplitude of stereo-filtered signal 320 will be larger than the amplitude of dual mono-filtered signal 324. Similarly, if the transmission is in dual mono mode, the amplitude of dual mono-filtered signal 324 will be larger than the amplitude of stereo-filtered signal 320. If the transmission is in mono mode, the amplitudes of signals 320 and 324 will both be relatively small and comparable to each other.

The relative sizes of the output amplitudes are used in decision circuit 306 to distinguish between the three signal modes. FIG. 4 is a block diagram detailing decision circuit 306. In this example, the amplitude of stereo-filtered signal 320 is referenced as w1(n). Likewise, the amplitude of dual mono-filtered signal 324 is referenced as w2(n). A mode determination signal 402, output by decision circuit 306, is referenced as decision(n). In this example, the three signal modes are referenced as stereo, dualmono, and mono.

Figure 5:
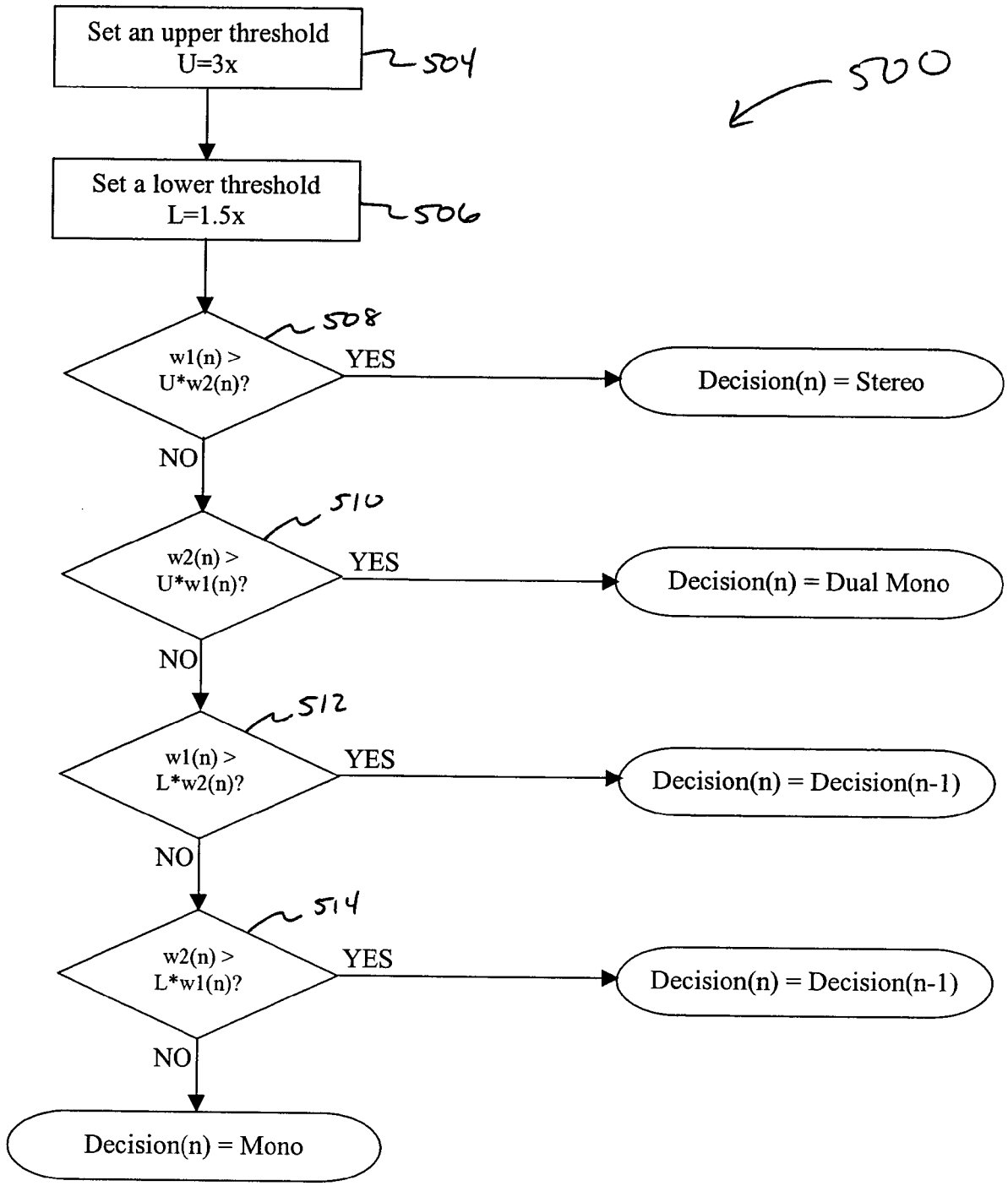
FIG. 5 is a flowchart of a method according to an embodiment of the present invention.

FIG. 5 is a flowchart of a method 500 according to an embodiment of the present invention. Method 500 may be used by decision circuit 306.

In step 504, an upper threshold U for one of the signals is set equal to, for example, 3 times the value of the amplitude of the other signal.

In step 506, a lower threshold L for the first signal is set equal to, for example, 1.5 times the value of the amplitude of the other signal.

In step 508, a comparison is made between the amplitude of stereo-filtered signal 320 and three times the amplitude of dual mono-filtered signal 324. If the amplitude of stereo-filtered signal 320 is more than three times larger than the amplitude of dual mono-filtered signal 324, then decision circuit 306 will determine that the JBTSC transmission is in stereo mode. For example, using the notation above, if [w1(n)>U*w2(n)], then decision (n)=stereo.

If a stereo signal is not present, that is, if [w1(n)<U*w2(n)], method 500 proceeds to step 510. In step 510, a second comparison is made. If the amplitude of dual mono-filtered signal 324 is more than three times larger than the amplitude of stereo-filtered signal 320, then decision circuit 306 will determine that the JBTSC transmission is in dual mono mode. For example, if [w2(n)>U*w1(n)], then decision(n)=dual-mono.

If neither of the above comparisons produce a definitive result, method 500 continues to step 512. In step 512, a comparison involving the lower threshold L is made. If the amplitude of stereo-filtered signal 320 is greater than 1.5 times the amplitude of dual mono-filtered signal 324, decision circuit 306 determines that the JBTSC transmission is in a state of transition. In this instance, instead of switching back and forth between transmission modes, decision circuit 306 will determine that the signal mode at issue is the same as the most recent signal mode used. For example, if [w1(n)>L*w2(n)], decision(n)=decision(n-1).

Likewise, in step 514, decision circuit 306 determines that the JBTSC transmission is in a state of transition, if the amplitude of dual mono-filtered signal 324 is greater than 1.5 times the amplitude of stereo-filtered signal 320. For example, if [w2(n)>L*w1(n)], decision(n)=decision(n-1). With this method, the transmission mode used will only change when the new transmission mode is stable.

Step 514 may be performed separately from step 512. Alternatively, step 514 may be performed concurrently with step 512, wherein the two are joined with an "or" statement. For example, if [w1(n)>L*w2(n)] or if [w2(n)>L*w1(n)], decision(n)=decision(n-1).

If none of the above conditions are met, that is, the comparisons do not produce a definitive result, decesion circuit 306 determines that the JBTSC transmission is in mono mode (decision(n)=mono). That is, the audio transmission is in mono mode when the amplitude of stereo-filtered signal 320 is lower than a lower threshold times the amplitude of dual mono-filtered signal 324 and the amplitude of dual mono-filtered signal 324 is lower than the lower threshold times the amplitude of stereo-filtered signal 320.

Figure 6:
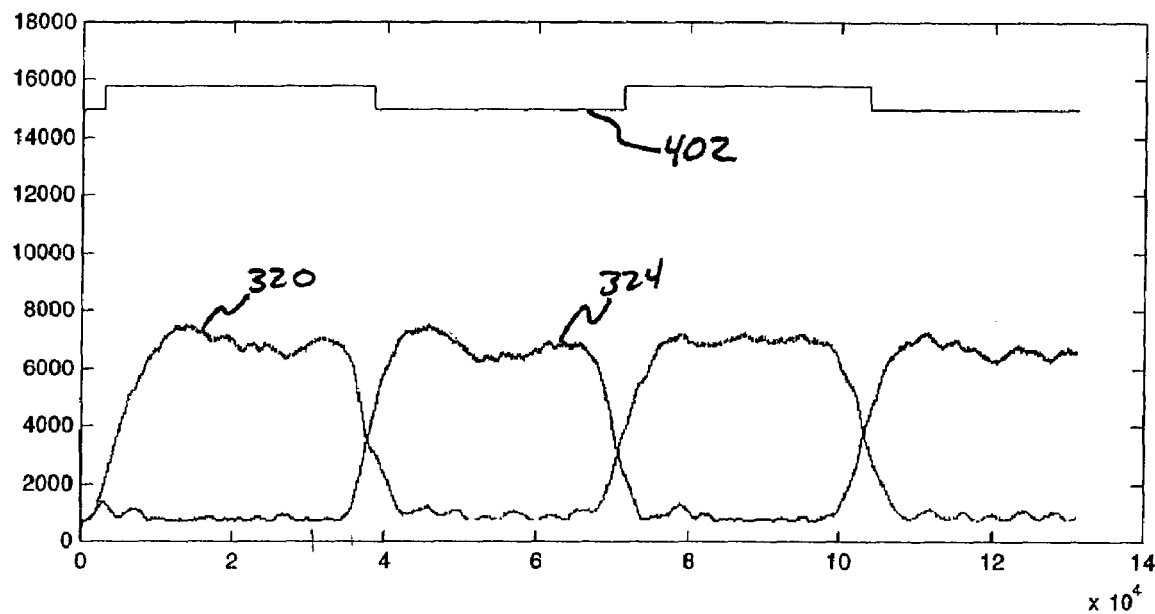
FIG. 6 is a timing diagram of signals produced by an embodiment of the present invention.

FIG. 6 is a timing diagram of mode determination signal 402, stereo-filtered signal 320, and dual mono-filtered signal 324. The values shown are in accordance with the embodiment described above. In FIG. 6, a higher value for mode determination in signal 402 corresponds to stereo mode. Similarly, a lower value for mode determination in signal 402 corresponds to dual mono mode.

As shown in FIG. 6, when stereo-filtered signal 320 has an amplitude that is at least three times larger than the amplitude of dual mono-filtered signal 324, mode determination signal 402 corresponds to stereo mode. As the amplitude of stereo-filtered signal 320 begins to decrease, and the amplitude of dual mono-filtered signal 324 begins to increase, mode determination signal 402 does not immediately change. During this transition period, the comparison made in step 512 of method 500 applies. Since the amplitude of stereo-filtered signal 320 is still greater than 1.5 times the amplitude of dual mono-filtered signal 324, decision circuit 306 outputs the same mode determination signal as previously output. Here, that mode determination is stereo mode.

Once the amplitude of dual-mono filtered signal 324 increases to at least three times the amplitude of stereo-filtered signal 320, decision circuit 306 recognizes that the JBTSC transmission is in a stable dual mono mode. At this point, the amplitude of mode determination signal 402 changes to reflect completion of the transition to dual mono mode.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of distinguishing mono, dual mono, and stereo modes in an audio transmission, said method comprising:
    (a) receiving a current audio signal including a current control signal;
    (b) filtering the current control signal around a first frequency;
    (c) filtering the current control signal around a second frequency;
    (d) comparing the result of step (b) with the result of step (c);
    (e) predetermining an adjustable upper threshold whose amplitude is used to evaluate the audio transmission modes;
    (f) predetermining an adjustable lower threshold, whose amplitude is less than that of the upper threshold, which is used to evaluate the audio transmission modes; and
    (g) determining the current audio transmission mode wherein:
        (i) the mode is stereo when an amplitude of the result of step (b) is greater than the upper threshold times the amplitude of the result of step (c);
        (ii) the mode is dual mono when an amplitude of the result of step (c) is greater than the upper threshold times the amplitude of the result of step (b); and
        (iii) the mode is mono when:
            the amplitude of the result of step (b) is lower than or equal to the lower threshold times the amplitude of the result of step (c); and
            the amplitude of the result of step (c) is lower than or equal to the lower threshold times the amplitude of step (b);
        (iv) the mode is that of the mode of the preceding measurement when:
            the amplitude of the result of step (b) is lower than or equal to the upper threshold times the amplitude of the result of step (c) and greater then the lower threshold times the amplitude of the result of step (c); or
            the amplitude of the result of step (c) is lower than or equal to the upper threshold times the amplitude of the result of step (b) and greater then the lower threshold times the amplitude of step (b); and
        (v) the mode is mono when there is no preceding measurement and:
            the amplitude of the result of step (b) is lower than or equal to the upper threshold times the amplitude of the result of step (c) and greater then the lower threshold times the amplitude of the result of step (c); or
            the amplitude of the result of step (c) is lower than or equal to the upper threshold times the amplitude of the result of step (b) and greater then the lower threshold times the amplitude of step (b).

2. The method of claim 1, wherein step (g)(ii) is performed only when the amplitude of the result of step (b) is not greater than the upper threshold times the amplitude of the result of step (c).

3. The method of claim 2, wherein step (g)(iii) is performed only when the amplitude of the result of step (c) is not greater than the upper threshold times the amplitude of the result of step (b).

4. The method of claim 1, wherein said first frequency is approximately ($3 f_H$-982.5 Hz), wherein $f_H$ is a horizontal scanning frequency.

5. The method of claim 1, wherein said second frequency is approximately ($3 f_H$-922.5 Hz), wherein $f_H$ is a horizontal scanning frequency.

6. The method of claim 1, wherein both of AM carrier detection and AM demodulation are not performed.

7. A system for distinguishing mono, dual mono, and stereo modes in an audio transmission, said system comprising:
    a first bandpass filter configured to filter at a first frequency;
    a first envelope tracker coupled to said first bandpass filter;
    a second bandpass filter configured to filter at a second frequency;
    a second envelope tracker coupled to said second bandpass filter; and
    a decision circuit, coupled to both of said first and second envelope trackers, wherein said decision circuit is configured to process decision logic to determine whether said audio transmission is in mono, dual mono, or stereo mode based on a comparison of an output of the first envelope tracker to an output of the second envelope tracker.

8. The system of claim 7, wherein said first bandpass filter is centered at approximately ($3 f_H$-982.5 Hz), wherein $f_H$ is a horizontal scanning frequency.

9. The system of claim 7, wherein said second bandpass filter is centered at approximately ($3 f_H$-922.5 Hz), wherein $f_H$ is a horizontal scanning frequency.

10. The system of claim 7, wherein said decision logic compares an amplitude of an output of at least one of said first and second envelope trackers to a threshold.

11. The system of claim 7, wherein said decision logic compares an amplitude of an output of at least one of said first and second envelope trackers to a predetermined adjustable upper threshold and a predetermined adjustable lower threshold.

12. The system of claim 11, wherein said upper threshold is 3 times the value of a smaller amplitude chosen from amplitudes of said first and second envelope trackers.

13. The system of claim 11, wherein said lower threshold is 1.5 times the value of a smaller amplitude chosen from amplitudes of said first and second envelope trackers.

14. The system of claim 7, wherein both of AM carrier detection and AM modulation are not performed.

* * * * *